United States Patent [19]

Ishihara

[11] Patent Number: 5,441,346
[45] Date of Patent: Aug. 15, 1995

[54] BALL SPLINE

[75] Inventor: Toyohisa Ishihara, Seki, Japan

[73] Assignee: Nippon Thompson Co., Ltd., Tokyo, Japan

[21] Appl. No.: 376,936

[22] Filed: Jan. 23, 1995

[30] Foreign Application Priority Data

Jan. 21, 1994 [JP] Japan .................................. 6-019845

[51] Int. Cl.⁶ .................................................. F16C 29/06
[52] U.S. Cl. ............................................................ 384/43
[58] Field of Search ................................. 384/43, 45, 44

[56] References Cited

U.S. PATENT DOCUMENTS

| | | | |
|---|---|---|---|
| 3,330,606 | 7/1967 | Suda | 384/43 |
| 3,719,979 | 3/1973 | Irwin | 384/43 X |
| 4,139,242 | 2/1979 | Ernst et al. | 384/43 |
| 4,206,951 | 6/1980 | Ernst et al. | 384/43 |
| 5,176,453 | 1/1993 | Jacob | 384/43 |

FOREIGN PATENT DOCUMENTS 58-52317  4/1983  Japan .
0361046  9/1991  Japan .

Primary Examiner—Thomas R. Hannon
Attorney, Agent, or Firm—Browdy and Neimark

[57] ABSTRACT

In this ball spline, ball retaining claws need not be provided on an outer cylinder body, and a retainer can be positioned accurately in the axial and circumferential directions of the outer cylinder body. The retainer is provided with axial movement stopper portions and turning preventing portions. In order to assemble the ball spline, the retainer inserted in the outer cylinder body is turned until the axial movement stopper portions slidingly contact both of axial end surfaces of the outer cylinder body with the turning preventing portions contacting turning preventing surfaces of the outer cylinder body. Consequently, the positioning of the retainer in the axial and circumferential directions thereof with respect to the outer cylinder body is effected. When the projections of the side rings are then fitted in the hollow spaces formed between the outer side surfaces of the projections and the wall surfaces of the grooves in the outer cylinder body, the retainer is fixed with respect to the outer cylinder body.

8 Claims, 5 Drawing Sheets

BALL SPLINE

BACKGROUND OF THE INVENTION

1. Field of the Invention

This invention relates to a ball spline in which a ball spline shaft having longitudinally extending raceway grooves is formed slidingly movably via a plurality of balls.

2. Description of the Prior Art

A ball spline formed so that an outer cylindrical member having a plurality of balls is moved linearly along a ball spline shaft has heretofore been applied to an industrial robot and a transfer machine. Such ball splines include ball splines in which the outer cylindrical members have retainers for holding a plurality of balls, and ball splines in which the outer cylindrical members have no retainers.

Japanese Patent Publication No. 61046/1991 discloses a ball spline having no retainers. This ball spline has a ball spline shaft 1 provided with a plurality of axially extending raceway grooves 2 in predetermined portions of an outer circumferential surface thereof, and an outer cylindrical body 3 provided with a bore through which the ball spline shaft 1 is slidably inserted, as shown in FIG. 12. The outer cylindrical body 3 is provided in an inner circumferential surface of the bore therein with raceway grooves 4, which are opposed to the raceway grooves 2 in the ball spline shaft 1, and return passages 5. The ball spline further has spacer rings 7 in which direction conversion passages 6 are formed, side rings 8, end seals 9 and a plurality of balls 10 fitted between the raceway grooves. The spacer rings 7, side rings 8 and end seals 9 are attached to both sides of the outer cylindrical body 3 with bolts 11. A distance between edge portions in cross section of each raceway groove 4 formed in the outer cylindrical body 3 so as to retain the balls 10 is set shorter than the diameter of the balls 10.

Japanese Utility Model Laid-Open No. 52317/1983 discloses a retainer-carrying ball spline. This ball spline is formed as shown in FIG. 13, by a ball spline shaft 1 provided with a plurality of axially extending raceway grooves 2 in predetermined portions of an outer circumferential surface thereof, an outer cylindrical body 3 provided in an inner surface thereof with raceway grooves 4 opposed to the raceway grooves 2 in the ball spline shaft 1, and inclined surface portions 12 for changing the direction of movement of the balls 10, a retainer 13 for retaining the balls 10 on the inner surface of the outer cylindrical body 3, and a plurality of balls 10. The retainer 13 is formed to a thin-walled seamless cylinder, the inner diameter of which is set larger at the portion thereof which corresponds to the balls 10 positioned in a no-load region of each return passage 5 in the retainer 13, and smaller at the portion thereof which corresponds to the balls 10 positioned in a load region of each raceway groove 4. The retainer 13 is provided with elongated bores 16 so that the balls 10 rolling in the load region project slightly. The retainer 13 is secured to the outer cylindrical body 3 by screwing nut type covering tubes 17 on both sides of an inner circumferential surface thereof.

Regarding conventional ball splines, it is difficult to form to proper shapes with a high accuracy the portions of the raceway grooves 4 which are in ball load regions formed in an outer cylindrical body 3, and direction change passages 6 formed in spacer rings 7 and side rings 8. In order to harden the portions of the raceway grooves 4 which are in ball load regions formed in the outer cylindrical body 3, the outer cylindrical body 3 as a whole is hardened, and this causes an increase in the ball spline manufacturing cost.

In the conventional ball splines, it is necessary that the raceway grooves in the outer cylindrical body 3 in which the retainer 13 is fitted firmly be hardened, and it is difficult to form in the outer cylindrical body 3 portions to which the retainer 13 is secured, this causing the cost of production of the outer cylindrical body 3 to become high.

SUMMARY OF THE INVENTION

A primary object of the present invention is to solve these problems, and provide a ball spline comprising a ball spline shaft and an outer cylinder fitted therearound and moving relatively thereto, and capable of forming raceway grooves, which are to be provided in an outer cylinder body constituting the outer cylinder, to a simple shape without forming ball retaining claws on the outer cylinder body; carrying out the grinding of the raceway grooves in the outer cylinder body easily and highly accurately; subjecting only the portions of the outer cylinder body that are to be provided with the raceway grooves to partial hardening; inserting a retainer in the outer cylinder body by utilizing grooves formed therein along the raceway grooves for carrying out the hardening step; accurately positioning the retainer, after it has been inserted into a predetermined portion of the outer cylinder body, with respect to the axial and circumferential directions thereof by turning the retainer in the same circumferential direction; forming return passages between the walls of the outer cylinder body and retainer without providing return bores in the outer cylinder body; and being manufactured at a low cost.

This ball spline comprises a ball spline shaft provided in its outer circumferential surface with at least two first raceway grooves extending in the axial direction thereof, and an outer cylinder fitted around and moving relatively to the ball spline shaft, the outer cylinder being formed by an outer cylinder body provided in the portions of the inner circumferential surface thereof which are opposed to the first raceway grooves with second raceway grooves and return passages extending in parallel with the second raceway grooves, side rings attached to both end portions of the outer cylinder body, and a retainer holding balls rolling circulatingly in the second raceway grooves, direction change passages and return passages, grooves being formed in the outer cylinder body so as to extend along and on both sides of the second raceway grooves, one of each set of these grooves constituting the return passages, projections of the retainer, which is inserted in the mentioned grooves in the outer cylinder body, extending from both end surfaces of the outer cylinder body, the projections being provided with ball circulating portions extending annularly in the axial direction and adapted to guide the balls, axial movement stopper portions formed at the inner side of both end parts of the ball circulating portions and adapted to restrict an axial movement of the outer cylinder body, and turning preventing portions adapted to restrict the turning direction of the outer cylinder body, direction change passages being formed on both sides of the ball circulating portions, elongated bores which enables the balls to roll in the first raceway grooves being provided in the parts of the ball circulating portions at which the first and second raceway grooves are opposed to each other, the side rings being provided with recesses opposed to the direction change passages, and projections for fixing the retainer to the outer cylinder body, these projections being fitted in hollow spaces defined by the grooves in the outer cylinder body and the outer circumferential surface of the retainer.

The parts of the ball circulating portions formed in the retainer which are opposed to the second raceway grooves formed in the outer cylinder body are formed to through bore type structures so that the balls roll between the first raceway grooves in the ball spline shaft and the second raceway grooves in the outer cylinder body. The second raceway grooves and the grooves for the hardening step which are provided in the outer cylinder body are formed to the same diametrical cross-sectional shape over the whole axial regions thereof. The axial movement stopper portions of the retainer are formed by projections extending at the inside corners of the direction change passages, and provided on the inner sides thereof with surfaces engaged with both end surfaces of the outer cylinder body and positioning the retainer in the axial direction thereof.

The retainer is formed to be axially longer than the outer cylinder body, and the side rings are engaged with both end surfaces of the outer cylinder body and fitted over both end portions of the retainer, the recesses in the side rings forming outer side wall surfaces of the direction change passages. The side rings are provided with escape recesses for carrying out an assembling step in the outer circumferential surfaces thereof. The portions of the inner circumferential surface of the elongated bores in the retainer which are at both axial ends thereof are provided with inwardly extending projections fitted in the first raceway grooves in the ball spline shaft, the balls projecting inward farther than the inwardly extending projections.

Since this ball spline is constructed as described above, the wall surfaces of the grooves in the outer cylinder body, the ball circulating portions of the retainer and the recesses in the side rings cooperate with one another to form the ball circulating passages, and the balls can roll smoothly along the ball circulating passages. The balls roll smoothly from load regions of the elongated bores in the circulating passages to no-load regions thereof, or from the no-load regions to the load regions, so that the outer cylinder comprising the outer cylinder body, retainer and side rings can be moved smoothly on and relatively to the ball spline shaft.

Therefore, this ball spline does not require the ball retaining claws, which are provided in a conventional ball spline, in the outer cylinder body, nor does it require a boring step which is carried out in a conventional ball spline to form return passages. The ball spline according to the present invention has linearly extending raceway grooves in the outer cylinder body, and is capable of forming these raceway grooves very easily with a high precision by grinding, and, moreover, forming the return passages by the inner circumferential surface of the outer cylinder body and the outer circumferential surfaces of the rolling element circulating portions of the retainer. Since a boring process for forming the return passages in the outer cylinder body is not required, the outer cylinder body processing precision can be improved with the occurrence of a processing error prevented.

In the step of assembling this ball spline, the retainer is inserted in the outer cylinder body, and then turned so that the axial movement stopper portions slidingly contact both of the axial end surfaces of the outer cylinder body, whereby the axial positioning of the retainer with respect to the outer cylinder body can be effected. During this time, the retainer is turned until the turning preventing portions have engaged the wall surfaces of the grooves for use in carrying out a hardening step in the outer cylinder body, whereby the circumferential positioning of the retainer with respect to the outer cylinder body can be effected. The projections of the side rings are fitted in the hollow spaces formed between the grooves for use in carrying out a hardening step in the outer cylinder body and the outer surfaces of the projections of the retainer, whereby the retainer can be fixed to the outer cylinder body. Moreover, this enables the wall surfaces of the recesses in the side rings to form the outer circumferential wall surfaces of the direction change passages in the retainer.

In order to assemble this ball spline, the retainer is inserted into the outer cylinder, and a side ring is attached to one end portion of the retainer. Since the direction change passage at the other end portion, around which the side ring is not fitted, of the retainer is in an exposed state, balls are inserted easily from the exposed direction change passage into the relative circulating passage.

The outer cylinder body does not require inclined surfaces for changing the direction of rolling of the balls and a portion to which the retainer is to be fixed, and the raceway grooves and grooves for return passages formed in the outer cylinder body have the same axial cross-sectional shape, so that these grooves can be cut straight in the axial direction. Namely, the outer cylinder body can be produced easily.

Since the grooves for carrying out a hardening step are formed along the raceway grooves, the weight of the outer cylinder body decreases, and coil inserting spaces are available. Therefore, it becomes possible to carry out the partial hardening of the raceway grooves, which constitute ball load regions, by high-frequency hardening using a high-frequency coil, and reduce the cost of manufacturing the outer cylinder body.

In this ball spline, the retainer is provided with a pair of axial movement stopper portions and turning movement preventing portions. Accordingly, when the retainer inserted in the outer cylinder body is turned in an assembling step so that the axial movement stopper portions slidingly contact both of the axial end surfaces of the outer cylinder body, the turning preventing portions contact turning preventing surfaces of the outer cylinder body, and the turning of the retainer is stopped in a position in which the elongated bores in the retainer are opposed to the raceway grooves in the outer cylinder body. Consequently, the axial positioning of the outer cylinder body and retainer can be done by the axial movement stopper portions.

In the position in which the circumferential turning of the retainer with respect to the outer cylinder body is stopped, hollow spaces are formed between the outer surfaces of the projections of the retainer and the side walls of the grooves for carrying out a hardening step in the outer cylinder body. Therefore, the retainer can be fixed to the outer cylinder body by engaging the recesses in the side rings with the projections mentioned above, fitting the projections formed on the side rings in the hollow spaces, and firmly fitting the side rings around the end portions, which project from the outer cylinder body, of the retainer. Accordingly, owing to the axial movement stopper portions and turning preventing portions of simple structures formed in the retainer, the outer cylinder body and retainer can be positioned and fixed simply and accurately in an assembling step.

The retainer and side rings can be formed out of a synthetic resin, and this enables the manufacturing cost to be reduced. The retainer can be formed easily to such a shape that permits the outer cylinder body, with which the retainer is to be combined, to be produced easily. The direction change passages formed at the side of the retainer around which the side ring is not fitted, with the outer cylinder body and retainer in a positioned state, project from the outer cylinder body with the retainer fixed thereto, and these passages are therefore exposed. Accordingly, a large number of balls can be inserted into the ball circulating passages via the direction change passages simply and reliably, and the assembling cost can be reduced.

In the endless ball circulating passages in this ball spline, semicircular gradients are provided on the direction change passages in the retainer but the other portions of the endless ball circulating passages and the recesses in the side rings, i.e. the outer side wall surfaces of the direction change passages are formed by a single surface respectively. Therefore, these passages can be formed easily, and the balls can be guided smoothly.

The inner circumferential surfaces of both of the axial end portions of the elongated bores in the retainer are provided with inwardly and axially extending projections capable of being fitted in the raceway grooves formed in the ball spline shaft, and the inwardly extending projections are provided with the end portions of the direction change passages which are continuous from the elongated bores. Since the end portions of the direction change passages are therefore formed so as to extend to the inner side of the elongated bores formed in the retainer, the balls rolling from the load regions to the no-load regions or from the no-load region to the load regions can be guided smoothly.

DESCRIPTION OF THE PREFERRED EMBODIMENT

Figure 11:
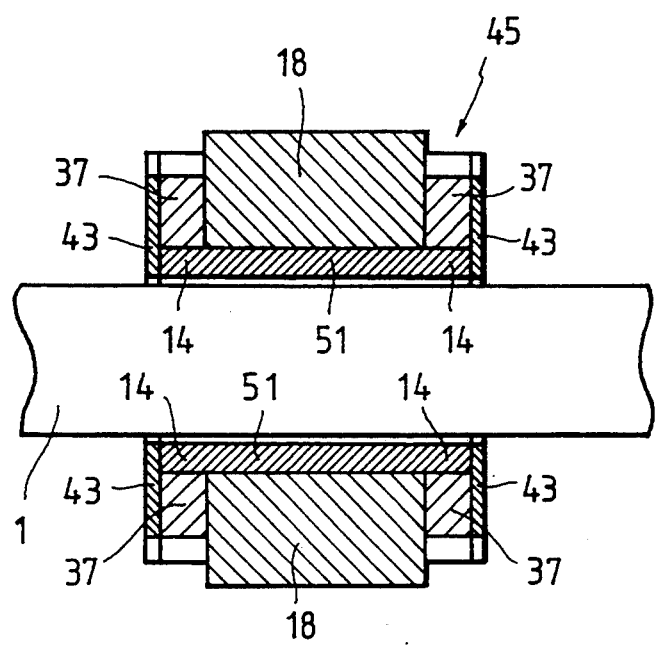
FIG. 11 is a sectional view taken along the line C—C in FIG. 1 and showing the rough arrangement of the parts of this ball spline.
Figure 12:
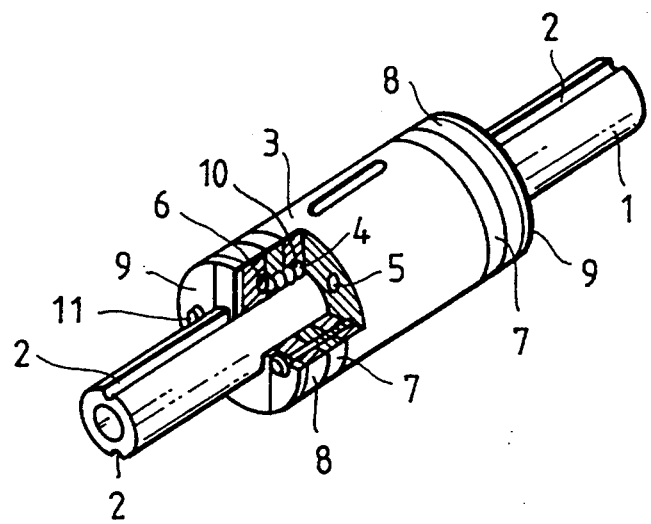
FIG. 12 is a partially cutaway view in perspective of a conventional ball spline.
Figure 13:
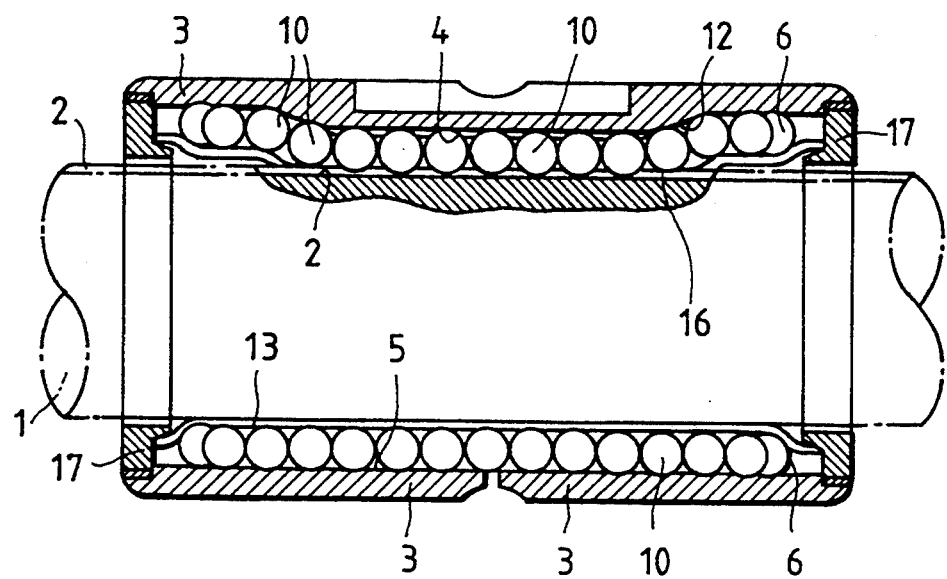
FIG. 13 is a sectional view of another conventional ball spline.

An embodiment of the ball spline according to the present invention will now be described with reference to the drawings. As shown in FIG. 11, this ball spline comprises a ball spline shaft 1 provided with at least a pair (two in diametrically symmetrical positions in the embodiment of FIG. 3) of longitudinally extending raceway grooves 2, which are similar to those in a conventional ball spline shaft 1, in an outer circumferential surface thereof, and an outer cylinder 45 fitted around and moved relatively to the ball spline shaft 1.

The outer cylinder 45 is formed by an outer cylinder body 18, side rings 37 provided on both end surfaces of the outer cylinder body 18, a retainer 51 provided in contact with the inner circumferential surfaces of the outer cylinder body 18 and side rings 37, balls 10 adapted to roll circulatingly in circulating passages formed in cooperation with the outer cylinder body 18, side rings 37 and retainer 51, and end surface seals 43 provided on the outer end surfaces of the side rings 37.

The outer cylinder body 18 is provided in the portions of its inner circumferential surface which are opposed to the raceway grooves 2 with raceway grooves 21, in parallel with which outside wall surfaces of return passages 29, i.e. ball guide surfaces 25 are formed.

The retainer 51 is provided with direction change passages communicating with the raceway grooves 21 and return passages 29, and the walls thereof are set on both end portions of the outer cylinder body 18. The retainer 51 is further provided with elongated bores 28 so as to retain the balls 10, the walls of the bores 28 are fixed to both end portions of the outer cylinder body 18. The balls 10 are inserted in the ball spline so that they roll circulatingly in the circulating passages formed by the raceway grooves 21, direction change passages 30 and return passages 29.

Figure 1:
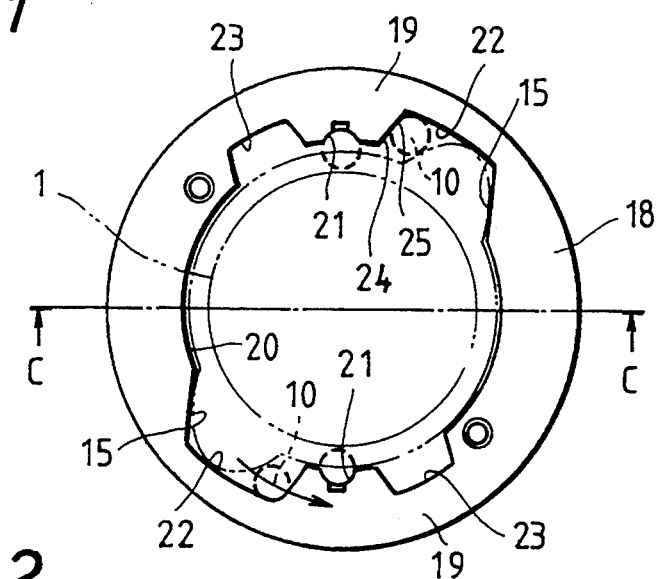
FIG. 1 is an end elevation of an outer cylinder body incorporated in an embodiment of the ball spline according to the present invention.

As shown in FIG. 1, the outer cylinder body 18 is provided with recesses, i.e. grooves 22, 23 along and on both sides of the raceway grooves 21 for carrying out a hardening step, and the grooves 22 out of the grooves 22, 23 constitute outer wall surfaces, i.e. ball guide surfaces 25 forming parts of the return passages 29.

Figure 2:
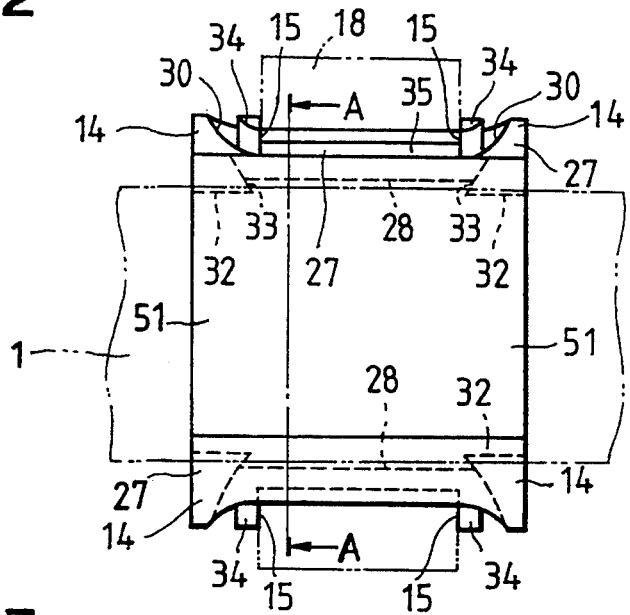
FIG. 2 is a side elevation of a retainer to be inserted in the outer cylinder body of FIG. 1.
Figure 3:
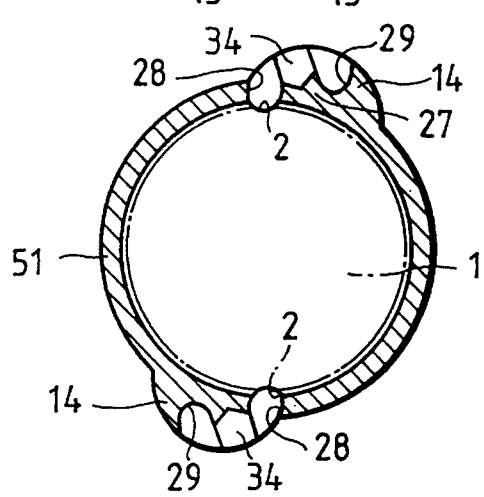
FIG. 3 is a sectional view taken along the line A—A in FIG. 2.
Figure 4:
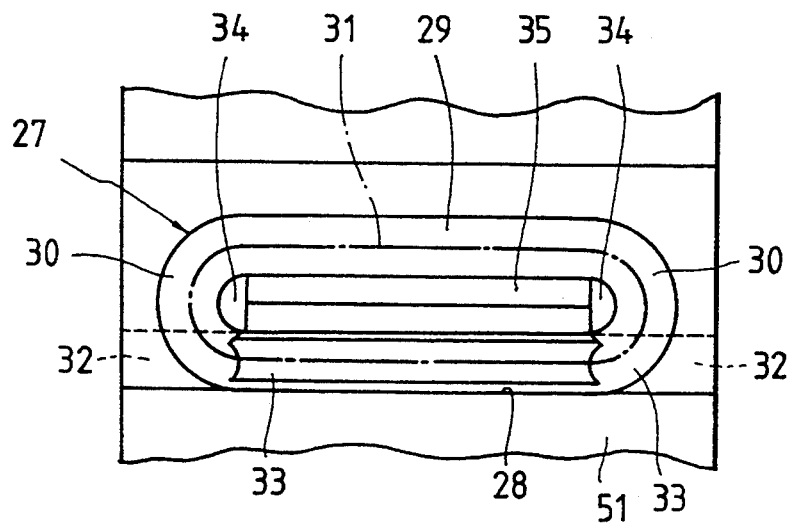
FIG. 4 is a partial plan view showing a ball circulating portion formed in the retainer.

As shown in FIGS. 2, 3 and 4, the retainer 51 has projections 14 capable of being inserted in the grooves 22 in the outer cylinder body 18 and extending in the axial direction of the outer circumferential surface of the retainer. The projections 14 are provided with axially and annularly extending ball circulating portions 27 adapted to guide the balls 10, axial movement stopper portions 34 at both of the inner end parts of the ball circulating portions 27, which portions 34 are adapted to restrict an axial movement of the outer cylinder body 18, and turning preventing portions 35 for restricting a turning movement of the outer cylinder body 18. Direction change passages 30 are formed at both end portions of the ball circulating portions 27, and elongated bores 28 at the parts of the ball circulating portions 27 at which the raceway grooves 2 in the ball spline shaft 1 and those 21 in the outer cylinder body 18 are opposed to each other, in such a manner that the balls 10 can roll on the raceway grooves 2.

Figure 5:
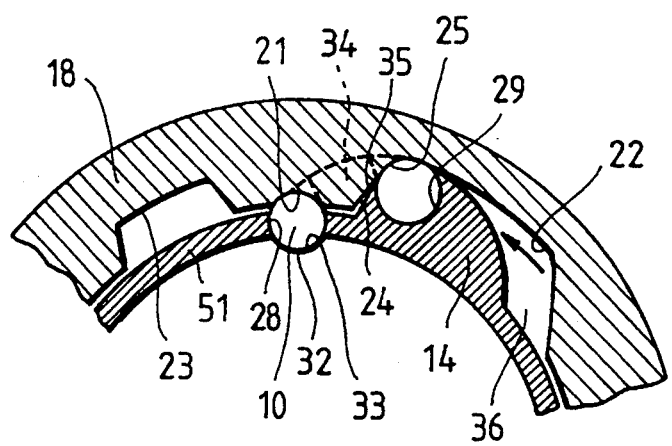
FIG. 5 is a partial sectional view showing the retainer fitted in the outer cylinder body.
Figure 6:
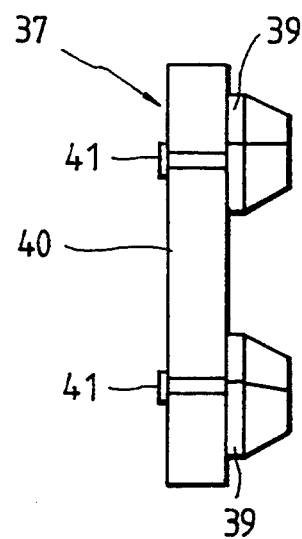
FIG. 6 is a side elevation of a side ring to be combined with the outer cylinder body of FIG. 1.
Figure 7:
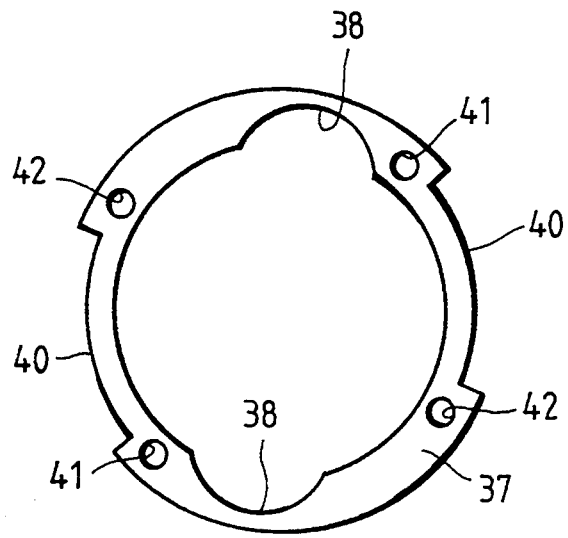
FIG. 7 is a front elevation of the side ring of FIG. 6.
Figure 8:
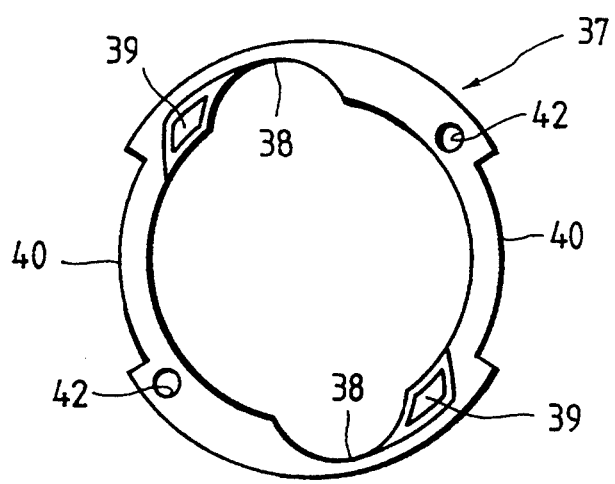
FIG. 8 is a rear elevation of the side ring of FIG. 6.

As shown in FIGS. 6, 7 and 8, each side ring 37 is provided with recesses 38 opposed to the direction change passages 30, and projections 39 for fixing the retainer 51 to the outer cylinder body 18. The projections 39 are formed so as to be fitted in the hollow spaces 36 (refer to FIG. 5) formed by the groove 22 in the outer cylinder body 18 and the outer circumferential surface of the retainer 51.

Each return passages 29 is formed by the groove 22 provided in the inner circumferential surface of the outer cylinder body 18 and the relative ball circulating portion 27 of the retainer 51. The part of the ball circulating portion 27 formed in the retainer 51 which is opposed to the relative raceway groove 21 formed in the outer cylinder body 18 is bored to be formed into a through type elongated bore 28 so that the balls 10 roll between the relative raceway groove 2 in the ball spline shaft 1 and that 21 in the outer cylinder body 18. The raceway grooves 21 and grooves 22, 23 in the outer cylinder body 18 are formed to similar linear diametrical cross-sectional shapes over the whole of the axial region regions thereof. The axial movement stopper portions 34 of the retainer 51 are formed by projections extending to the inside corners of the direction change passage 30, and surfaces 15 contacting both end surfaces of the outer cylinder body 18 and positioning the retainer 51 in the axial direction are formed on the inner side of these projections.

The retainer 51 is formed to be axially longer than the outer cylinder body 18, and the side rings 37 contact both end surfaces of the outer cylinder body 18 and are fitted around both end portions of the retainer 51. The recesses 38 in the side rings 37 constitute the outer circumferential wall surfaces of the direction change passages 30. The side rings 37 are provided with escape recesses 40 in the outer circumferential surfaces thereof. The portions of the inner circumferential surfaces of the elongated bores 28 in the retainer which are at both of the axial ends thereof are provided with inwardly extending projections 32 to be inserted in the raceway grooves 2 in the ball spline shaft 1, and the balls 10 rolling in the elongated bores 29 project inward farther than the inwardly extending projections 32. End surface seals 43 are attached to the end surfaces of the side rings 37. The end seals 43 have end surface seal portions 47 partially so as to effect the sealing of only the regions of the ball circulating passages 27 which are between the raceway grooves 2 in the ball spline shaft 1 and those 21 in the outer cylindrical body 18.

In this ball spline, the outer cylinder body 18 is formed to a cylindrical shape, and provided in the portions of the inner circumferential surface 20 thereof which are opposed to the raceway grooves 2 in the ball spline shaft 1 with raceway grooves 21 extending axially, as shown in FIG. 1. At circumferential both sides of each raceway groove 21, a wall surface of return passage 29, i.e. a ball guide surface 25 and a groove 23 constituting an escape groove are formed in parallel with the raceway groove 21 so as to extend in the axial direction of the ball spline shaft 1. The inner circumferential surface 20 of the outer cylinder body 18 is formed to the same diametrical cross-sectional shape over the whole region thereof. The return passages 29 have a diameter larger than that of a ball 10, and the outer wall surfaces, which form the return passages 29, i.e. the ball guide surfaces 25 constitute the turning preventing surfaces 24 of the retainer 51. The grooves 22, 23 are utilized when the raceway grooves 21 are partially hardened by the high-frequency hardening using a high-frequency coil, and the grooves 22 out of the grooves 22, 23 are utilized for inserting the projections 14 of the retainer 51 therein. In order to reduce hardening strain, it is preferable to form these grooves 22, 23 so that the distance between the raceway grooves 21 and the grooves 22, 23 becomes substantially equal. The axial end surfaces 19 of the outer cylinder body 18 are provided with bores via which the side rings and end surface seals 43 are fixed thereto.

The retainer 51 holding a plurality of balls 10 on the inner surface 20 of the outer cylinder body 18 is formed out of an alloy or a synthetic resin and in a cylindrical shape axially longer than the outer cylinder body 18, and provided at the symmetrical portions of the outer circumferential surface thereof with projections 14 having a cross-sectionally arcuate shape and constituting ball circulating portions 27 capable of being inserted in the grooves 22 in the outer cylinder body 18.

Each ball circulating portion 27 is provided with an axially extending elongated bore 28, the width of which is smaller than the diameter of a ball 10, at an intermediate portion of one axially extending edge thereof as shown in FIG. 4. A ball circulating passage formed in this ball circulating portion 27 comprises the elongated bore 28, a return passage 29 extending in parallel with the elongated bore 28, and arcuate direction change passages 30 joined to the terminal ends of the elongated bore 28 and return passage 29. Namely, the ball circulating portion 27 is provided with an endless circulating guide passage 31 for endlessly circulating and guiding the balls 10 in the elongated bore 28, return passage 29 and direction change passages 30.

At the portions of the inner circumferential surface of the retainer 51 which correspond to both of the axial ends of each elongated bore 28, axially and inwardly extending projections 32 engageable with the relative raceway groove 2 in the ball spline shaft 1 are formed, and, at the outer side of the inwardly extending projections 32, end portions 33 of the direction change passages 30 continuing the elongated bore 28 are formed. Since the end portions 33 of the direction change passages 30 extend to the inner side of the elongated bore 28 formed in the retainer 51, they can guide the balls 10 smoothly.

These two-way direction change passages 30 are provided at the axially inner side thereof with cross-sectionally semicircular axial movement stopper portions 34 projecting therefrom. The arcuate parts of the axial movement stopper portions 34 are formed so as to face the direction change passages 30, so that the inner guide surfaces for the balls 10 circulatingly rolling in the direction change passages 30 are formed as inside corner wall surfaces. The flat parts of these two axial movement stopper portions 34 face in the axially inward direction, and are formed so as to be spaced from each other by a distance which permits those flat parts to be circumscribed with the two axially end surfaces 19 of the outer cylinder body 18. A space between the two axial movement stopper portions 34 and between the return passage 29 and elongated bore 28 is provided with a turning preventing portion 35 comprising an inclined surface.

The relation between the outer cylinder body 28 and retainer 51 will now be described. The retainer 51 is inserted with its ball circulating portions 27 opposed to the grooves 22 in the outer cylinder body 18 into the outer cylinder body 18 until the front side axial movement stopper portions 34 appear from the opposite side portion of the outer cylinder body 18. When the retainer 51 is then turned in the direction (shown by an arrow in FIG. 5) in which the ball circulating portions 27 approach the raceway grooves 21 in the outer cylinder body 18, the flat parts on the inner side of the axial movement stopper portions 34 are turned as they slidingly contact the two axial end surfaces 19 of the outer cylinder body 18, and the turning preventing portions 35 of the retainer 51 engage the turning preventing surfaces 24 for the retainer 51 which are formed in the recesses 22 in the outer cylinder body 18 as shown in FIG. 5, the turning of the retainer 51 being stopped in a position in which the elongated bores 28 in the retainer 51 are opposed to the raceway grooves 21 in the outer cylinder body 18. The retainer 51 in this condition is positioned axially with respect to the outer cylinder body 18 by the two axial movement stopper portions 34, and circumferentially with respect to the outer cylinder body 18 with the turning of the retainer in the circumferential direction stopped.

Each side ring 37 shown in FIGS. 6, 7 and 8 is formed out of an alloy or a synthetic resin annularly, and adapted to be fitted firmly around the end portion, which projects to the outside of the outer cylinder body 18, of the retainer 51 inserted in and positioned with respect to the outer cylinder body 18 as mentioned above. The side ring 37 is provided in its inner circumferential surface with arcuate recesses 38 to be engaged with the ball circulating portions 27, which project from the outer cylinder body 18, of the retainer 51, and the inner wall surfaces of the recesses 38 are adapted to guide the balls 10 moving on the outer side surfaces of the direction change passages 30 in the retainer 51.

After the retainer 51 inserted in the outer cylinder body 18 has started being turned, the projections 39 formed on the side ring 37 are fitted in the hollow spaces 36 formed by the portions of the outer cylinder-side surface of the side ring 37 which are adjacent to the recesses 38 and the wall portions of the grooves 22 in the outer cylinder body 18 which are on the opposite side of the raceway grooves. Thus, the relative turning of the outer cylinder body 18 and retainer 51 is stopped, and these two parts are fixed. The free end portions of the projections 39 of the side ring 37 are provided with inclined surfaces so that the projections 39 easily fit in the hollow spaces formed after the retainer is turned. The projections 39 may be formed to a shape which permits the projections 39 to be inserted into the hollow spaces 36, which are formed by the wall surfaces of the grooves 22 in the outer cylinder body 18 and the outer circumferential surfaces of the projections 14 of the retainer, and the outer circumferential surfaces and the retainer 51 to be fixed to each other. The shape of the projections is not limited to that shown in the drawings.

Each side ring 37 is provided in its outer circumferential surface with escape recesses 40 of a suitable shape. The escape rings 40 work, when a ball spline assembly is incorporated into a bearing box by press fitting, in such a manner that the outer cylinder body 18 can be pushed directly without pushing the side ring 37 which is liable to be broken. The surface of the side ring 37 which is on the opposite side of the outer cylinder is provided with a pair of projections 41 for positioning the relative end surface seal 43 to be provided on the outer side surface of the side ring 37, and the portions of the side ring 37 which are opposed to the fixing holes made in the outer cylinder body 18 are provided with holes 42 through which fixing bolts are to be inserted.

Figure 9:
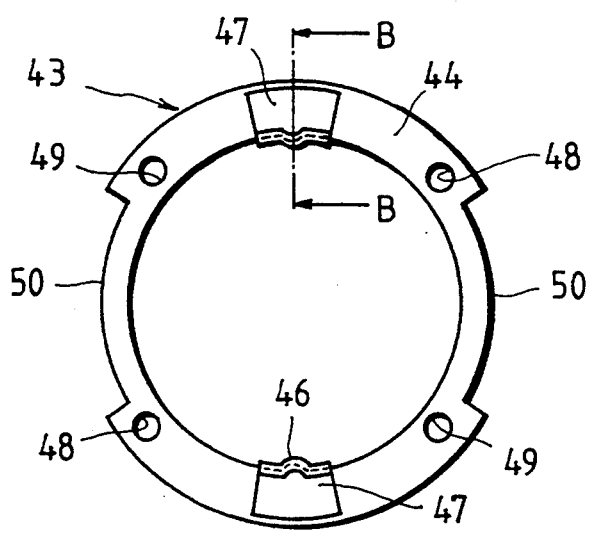
FIG. 9 is a front elevation of an end seal to be combined with the outer cylinder body of FIG. 1.
Figure 10:
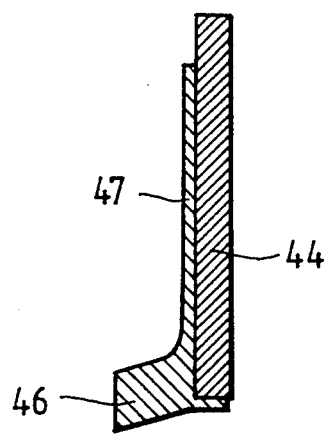
FIG. 10 is a sectional view taken along the line B—B in FIG. 9.

As shown in FIG. 11, end surface seals 43 are provided on the axially outer sides of the side rings 37. Each end surface seal 43 is formed by fixing seal members 47, which have lip portions 46 formed out of an elastic material, such as rubber or a synthetic resin for sealing the portions of the seal 43 which slidingly contact the ball spline shaft 1 to an annularly formed metal plate 44 of steel by baking as shown in FIG. 9. The end surface seal 43 is also provided with positioning bores (or holes) 48 engageable with the positioning projections 41 of the relative side ring 37, and fixing bolt inserting holes 49 and escape recesses 50 both of which are similar to those in the side rings 37. The end surface seal 43 can also be sealed by partially forming seal members to be bake-bonded to the metal plate 44, so as to reduce the frictional resistance thereof with respect to the ball spline shaft 1.

This ball spline can be assembled in the following manner.

First, the retainer 51 is inserted into the outer cylinder body 18 with the projections 14, which constitute the ball circulating portions 27 of the former, opposed to the grooves 22 in the latter, until the front axial movement stopper portions 34 appear from the opposite side of the outer cylinder body 18.

When the retainer 51 is turned in the direction in which the projections 14 come close to the raceway grooves 21 in the outer cylinder body 18, it moves as the inner flat parts of the axial movement stopper portions 34 slidingly contact both of the axial end surfaces 19 of the outer cylinder body 18, and the turning preventing portions 35 of the retainer 51 engage the turning preventing surfaces 24, which are formed in the grooves 22 for carrying out a hardening step in the outer cylinder body 18, of the retainer 51, the turning of the retainer 51 being stopped in a position in which the elongated bores 28 in the retainer 51 are opposed to the raceway grooves 21. The positioning of the retainer 51 in the circumferential direction with respect to the outer cylinder body 18 is thus effected.

When the turning of the retainer 51 and outer cylinder body 18 is stopped, hollow spaces 36 are formed between the outer side surfaces of the projections 14 of the retainer 51 and the walls of the grooves 22 for carrying out a hardening step in the outer cylinder body 18 which are on the opposite side of the raceway grooves. Therefore, one side rings 37 is fitted around one end portion, which projects outside of the outer cylinder body 18, of the retainer 51 by fitting the recesses 38 in the side ring 37 around the projections 14 of the retainer 51, and then inserting the projections 39 of the side ring 37 into the hollow spaces 36.

The retainer 51 is fixed to the outer cylinder body 18 by this assembling step, so that the retainer 51 cannot be moved relatively to the outer cylinder body 18 in the axial and circumferential directions. Since the direction change passages 30 in the retainer 51 project from the end surface 19, on which a side ring 37 is not yet attached, of the outer cylinder body 18, a plurality of balls 10 are inserted from the same direction change passages 30 into the endless circulating guide passages 31. The other side ring 37 is then fixed to the retainer 51 in the same manner as mentioned above. The end face seals 43 are fixed by fitted the positioning holes 48 over the projections 41 of the side rings 37, and the assembling of the ball spline is completed by inserting assembling bolts into the bolt inserting holes 49 in the end surface seals 43, bolt inserting holes 42 in the side rings 37 and the fixing holes in the outer cylinder body 18.

What is claimed is:

1. A ball spline comprising:

a ball spline shaft provided in an outer circumferential surface thereof with at least two longitudinally extending raceway grooves, an outer cylinder fitted around and moving relatively to said ball spline shaft, said outer cylinder having an outer cylinder body provided with second raceway grooves in the portion of an inner circumferential surface thereof which are opposed to said first raceway grooves, and return passages parallel to said second raceway grooves, side rings fixed to both end portions of said outer cylinder body, balls adapted to circulatingly roll in said second raceway grooves, direction change passages and said return passages, and a retainer holding said balls therein, said outer cylinder body being provided with grooves along said second raceway grooves, one set of which grooves constitutes said return passages, said retainer having projections capable of being inserted into said grooves in said outer cylinder body and extending axially from outer circumferential portions thereof, each of said projections being provided with a ball circulating portion extending annularly in the axial direction and adapted to guide said rolling elements, an axial movement stopper portion formed at both inner end parts of said ball circulating portion and adapted to restrict an axial movement of said outer cylinder body, and a turning preventing portion adapted to restrict a circumferential movement of said outer cylinder body, said direction change passages being formed at both end parts of said ball circulating portion, said ball circulating portions being provided at the parts thereof at which said first and second raceway grooves are opposed to each other with elongated bores so that said balls can roll on said first raceway grooves, and said side rings being provided with recesses opposed to said direction change passages, and projections for fixing said retainer to said outer cylinder body, said projections being fitted in hollow spaces formed by said grooves in said outer cylinder body and an outer circumferential surface of said retainer.

2. A ball spline according to claim 1, wherein said return passages are formed by said grooves in an inner circumferential surface of said outer cylinder body and said ball circulating portions of said retainer.

3. A ball spline according to claim 1, wherein said ball circulating portions formed on said retainer are provided at the parts thereof which are opposed to said second raceway grooves in said outer cylinder body with through bores so that said rolling elements roll between said first raceway grooves in said ball spline shaft and said second raceway grooves in said outer cylinder body.

4. A ball spline according to claim 1, wherein said second raceway grooves and said grooves both which are formed in said outer cylinder body have the same diametrical cross-sectional shape over the whole axial regions thereof.

5. A ball spline according to claim 1, wherein said axial movement stopper portions of said retainer are formed by projections extending to inside corners of said direction change passages, said projections being provided on the inner side thereof with surfaces contacting both end surfaces of said outer cylinder body and positioning said retainer in the axially direction thereof.

6. A ball spline according to claim 1, wherein said retainer is formed to be axially longer than said outer cylinder body, said side rings being engaged with both end surfaces of said outer cylinder body and fitted around both end portions of said retainer, said recesses in said side rings constituting circumferential side walls of said direction change passages.

7. A ball spline according to claim 1, wherein said side rings are provided with escape recesses in outer circumferential surfaces thereof.

8. A ball spline according to claim 1, wherein the inner circumferential surfaces of both of axial end portions of said elongated bores in said retainer are provided with inwardly extending projections fitted in said first raceway grooves in said ball spline shaft, said balls projecting inward farther than said inwardly extending projections.

* * * * *